Feb. 15, 1938. C. J. HECHT Re. 20,652

BLOCK TOY

Original Filed Feb. 10, 1936 3 Sheets-Sheet 1

INVENTOR;
Clinton J. Hecht,

BY Arthur J. Farnsworth.
ATTORNEY.

Feb. 15, 1938. C. J. HECHT Re. 20,652

BLOCK TOY

Original Filed Feb. 10, 1936 3 Sheets-Sheet 2

INVENTOR;
Clinton J. Hecht,
BY Arthur J. Farnsworth.
ATTORNEY.

Feb. 15, 1938. C. J. HECHT Re. 20,652

BLOCK TOY

Original Filed Feb. 10, 1936 3 Sheets-Sheet 3

INVENTOR;
Clinton J. Hecht,
BY Arthur J. Farnsworth.
ATTORNEY.

Reissued Feb. 15, 1938

Re. 20,652

UNITED STATES PATENT OFFICE 20,652

BLOCK TOY

Clinton J. Hecht, Los Angeles, Calif., assignor to Lane Rhodes and William H. Hammer, both of Santa Monica, Calif.

Original No. 2,078,709, dated April 27, 1937, Serial No. 63,202, February 10, 1936. Application for reissue October 9, 1937, Serial No. 168,-297

23 Claims. (Cl. 46—115)

In this specification, and the accompanying drawings, I shall describe and show preferred embodiments of my invention, and specifically mention certain of the more important objects. I do not limit myself to the exact forms disclosed, however, since various changes and adaptations may be made therein without departing from the essence of the invention as hereinafter claimed.

My invention relates to toys that are adapted to afford amusement and instruction, and among its more important objects are: First, to provide a set of toy blocks of novel form and functional capacity, which may be used for amusement purposes as a game; second, to furnish blocks of this kind, preferably of figure form, that also supply means for exercising ingenuity in a marked degree, in order to make a large and indefinite number of possible arrangements thereof; third, to afford facilities for interestingly imparting a knowledge of certain principles of mechanics, and particularly methods for resisting gravitational moments by means of other force moments; and fourth, to accomplish the stated objects in a simple and relatively inexpensive manner.

My invention comprises a considerable but indefinite number of elements, which may be of several general types. All elements of each particular kind are identical, and all kinds of elements of each set of the blocks have many features in common. Every element, of whatever kind, is adapted to cooperate with any other element of its set, or an indefinite number of such other elements, in many different ways.

In the form of my invention selected for illustrative purposes, each of the four kinds of elements shown are roughly in the shape of a human or other figure to provide interest. These elements may be assembled to represent many different self-supporting acrobatic groups, arranged in vertical planes.

In the accompanying drawings.

The elements of Figs. 6–10 are drawn to a reduced scale in comparison to Figs. 1–5 inclusive; and they are shown in outline only, for the purpose of simplicity. Similar reference numerals refer to similar parts throughout the several views.

Figure 6:
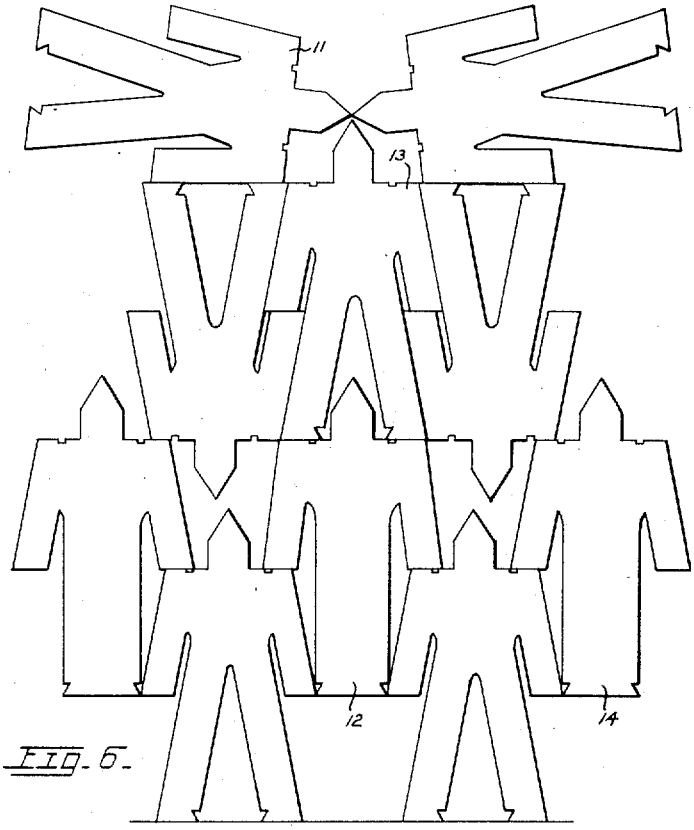
Figure 6 is a front elevation representing an acrobatic group, in which elements of all four of the illustrated kinds are employed cooperatively.
Figures 1, 2, 3, 4, 5:
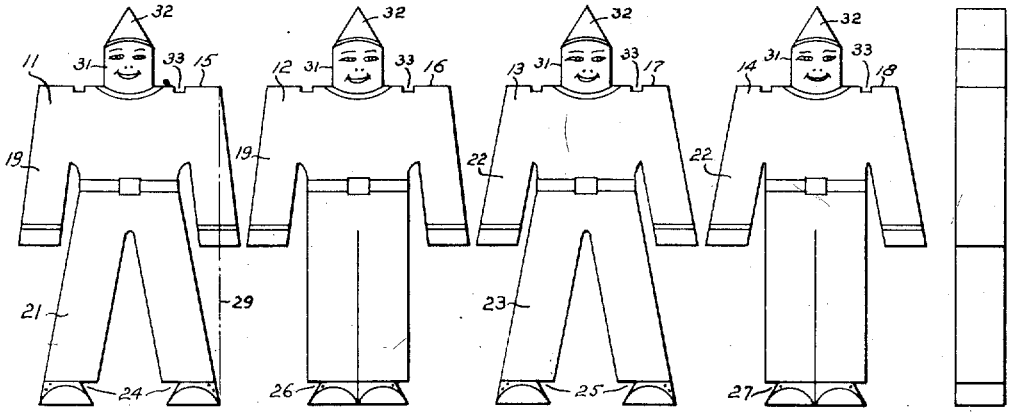
Figure 1 is a front elevation of a typical element having spread legs.
Figure 2 is a front elevation of an element that is identical with that of Fig. 1 with respect to the arms and upper portions, but having the legs close together, and the foot portions differently shaped.
Figure 3 is a front elevation of an element that is closely similar to that of Fig. 1, but having narrower shoulders for the purpose of making the angle of divergence of the arms the same as the angle of divergence of the legs.
Figure 4 is a front elevation of a unit that is identical with that of Fig. 3 with respect to the arms and upper portions, but having the legs close together, and the foot portions differently shaped.
Figure 5 is a side elevation of the element shown in Fig. 4.

The elements shown in Figs. 1 to 4 inclusive, are designated generally by the reference numerals 11, 12, 13 and 14 respectively. The lower portions of elements 11 and 12 are identical in dimensions with the lower portions of elements 13 and 14 respectively. The shoulders 15 and 16, of elements 11 and 12, are of equal width and are wider than the shoulders 17 and 18, of elements 13 and 14. The latter are of the same width with respect to each other. The angle of divergence of the arms 19 of elements 11, is less than that of legs 21 and in the arms 19 of element 12 the angle of divergence is substantially the same as that of legs 21. Referring to elements 13 and 14, the arms 22 on one side thereof are substantially parallel to the legs 23 of element 13 on the same side thereof when the elements are standing on one plane as shown in Figures 3 and 4.

Figure 7:
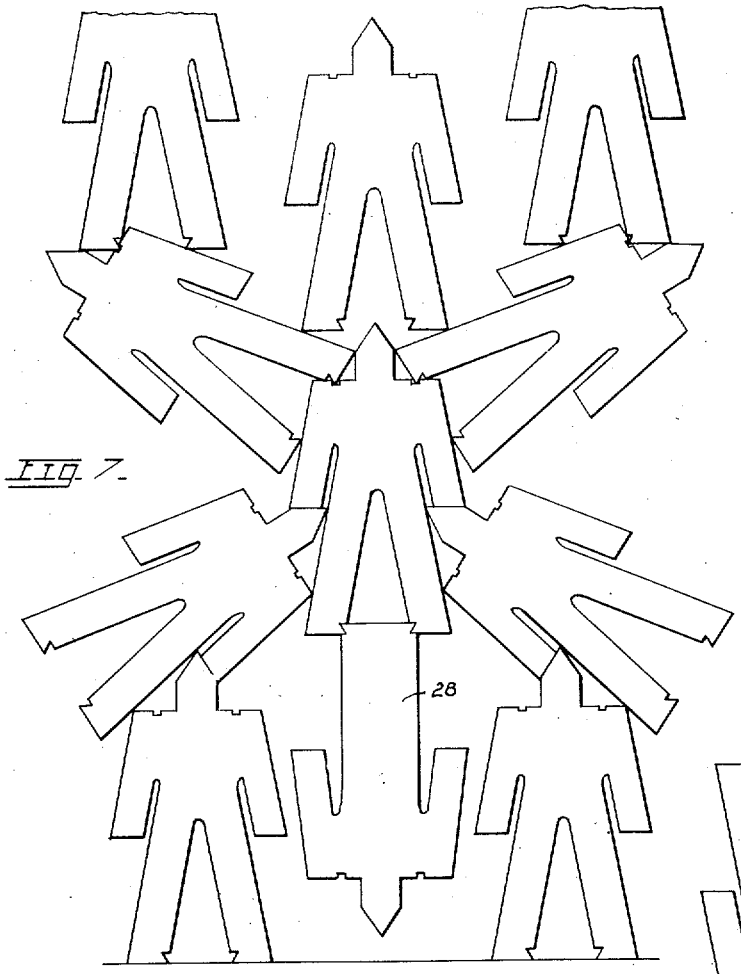
Figure 7 is a similar elevation of another arrangement of elements, of two of the illustrated kinds.
Figure 8:
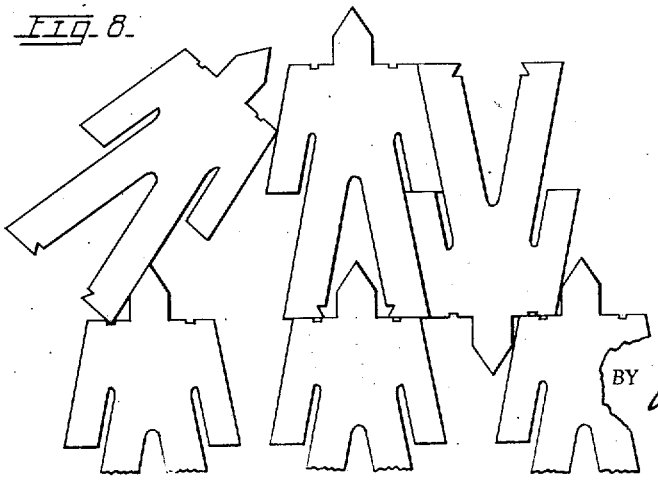
Figure 8 is a front elevation of a portion of a group in which elements of a single kind are arranged in still another manner.

Elements 11 and 13 have V-notches 24 and 25 at the respective lower extremities of the legs, on the inside. Elements 12 and 14 have similar notches 26 and 27 at the respective lower extremities of the legs, on the outside. The dimensions and configuration of the lower extremities of all of the elements are made such that the lower extremities of elements 12 and 14 may be made to engage the lower extremities of elements 11 and 13, by turning one of the engaging pair of elements upside down, as shown in Fig. 7 at 28.

In each kind of element illustrated, the vertical distance from the shoulders to the lower extremities of the arms, is made the same as the distance from said extremities to the bottoms of the feet. The spread of the feet of elements 11 and 13 is made the same as the width of shoulders of elements 11 and 12. The divergence of arms 19 is made such that a line 29, drawn between a shoulder corner and the corresponding outer corner of the foot portion, bisects the lower extremity of the arm.

Head and neck portions 31 extend perpendicularly upward from the center of the shoulders, and the heads are surmounted by pointed helmets 32. Each shoulder of the elements has a transverse rectangular notch 33 thereacross, at a distance from the neck portion that is approximately equal to half the width of the neck. Notches 33 are adapted for engagement by the apices of helmets 32, and by many other corners of the elements. Thus they are of assistance in properly and accurately positioning the elements in groups; and for maintaining stable equilibrium of the groups and the elements therein.

The elements are made of uniform substantial thickness, as indicated in Fig. 5; so that they may be stood upright and have sufficient base area to support a considerable superposed structure, of kinds similar to those of Figs. 6 to 10, inclusive.

It will be noted that certain elements of the illustrated groups would not be in stable equilibrium were it not for the force moments that are developed. Thus in Fig. 10 the elements 34 and 35 could not remain in the position shown, except for the force moments exerted thereon at 36 and 37; and elements 38 and 39 require force moments to be exerted thereon at 41 and 42, to lend stability.

Figure 9:
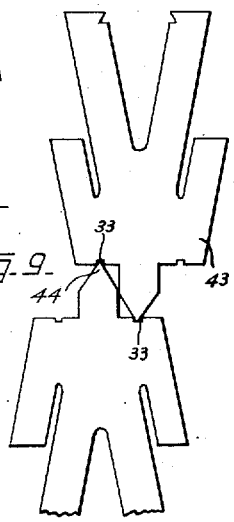
Figure 9 is a front elevation illustrating a special manner of combining two elements in stable equilibrium.
Figure 10:
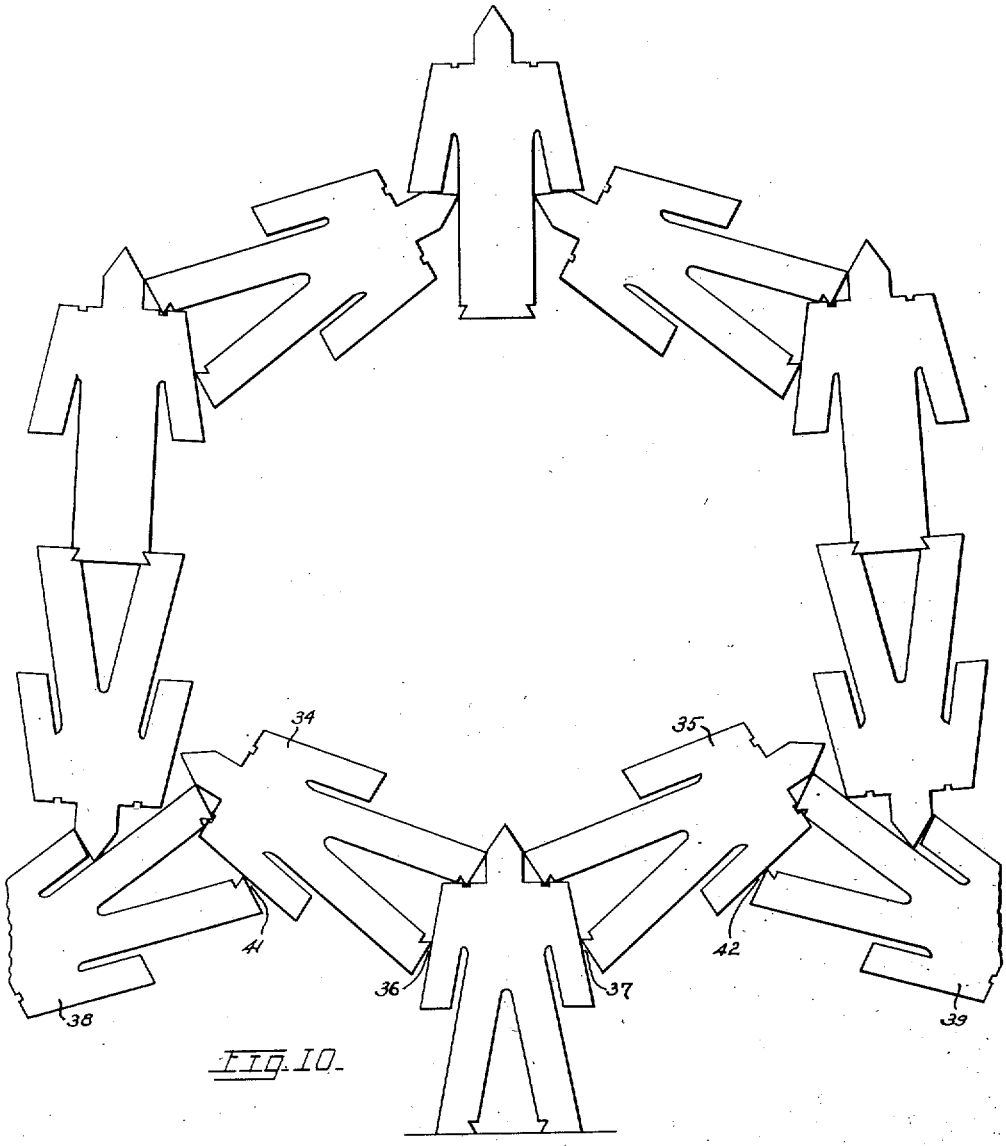
Figure 10 is a front elevation of a group comprising elements in seemingly impossible positions; the group being in stable equilibrium, however, and supported entirely by a single element at the bottom.

The arrangement shown in Fig. 9 requires the cooperation of notches 33 for permanent stability. Element 43 of this figure cannot swing to the right, since it is prevented from doing this by the engagement of helmet peak 44 with notch 33.

It will be apparent from the foregoing description that my invention provides means for studying force moments in an interesting and instructive manner. It will also be seen that the invention affords great opportunity for ingenuity in arranging the elements in new ways, to constitute self-supporting groups. Furthermore, it will be observed that the invention may be utilized as a game, in various ways, such as by trying to build up the greatest number of self-supporting group arrangements with a definite number of elements; the elements being either all of one kind, or of several kinds in varying proportions.

The term toy in the claims is to be understood as applying to, and describing, any type of block whether the same is formed to represent a human form or that of any form of animal or insect; or a block which does not represent any animate form. The terms body portion, head, neck, and limbs, in the claims, are to be understood as mechanical terms so as not to be limited to, but which may include by these terms parts of the human body or that of animals, birds, insects, etc. Be it further understood that the drawings and specification are for illustrative purposes only, as my invention is capable of being embodied in various forms. I therefore desire to be limited only to the extent as defined by the appended claims construed in the light of the definitions of this paragraph.

I claim as my invention:—

1. A toy comprising a plurality of identically shaped blocks of substantial thickness representing a human form, adapted for being assembled edgewise upon each other in a vertical plane, to form various groups in stable equilibrium; said blocks having head and neck portions extending perpendicularly from the shoulder portions, and notches extending transversely across the shoulder portions at a distance from the neck approximately equal to half the width of the neck; the blocks having central pointed head extremities, and other sharp transversely extending corners for engaging said notches of similar blocks; and the blocks being adapted for mutual peripheral engagement to cooperatively maintain group equilibrium while in positions suggesting instability, through opposing gravitational moments by non-vertical force moments.

2. A toy comprising a plurality of types of blocks of substantial thickness, adapted for being assembled edgewise upon each other in a vertical plane, to form various groups in stable equilibrium; said blocks representing a human form having neck portions extending perpendicularly from the shoulder portions, heads with central pointed extremities representing peaked helmets, and diverging arm portions extending downwardly from the shoulders; the blocks being provided with notches extending transversely across the shoulder portions at a distance from the neck approximately equal to half the width of the neck, and having a plurality of sharp transversely extending corners adapted to selectively engage said notches; the blocks being adapted for mutual peripheral engagement to cooperatively maintain group equilibrium while in positions suggesting instability, through opposing gravitational moments by non-vertical force moments; the blocks of one type having diverging legs allowing the head and neck portions of an immediately underlying block to enter therebetween, and the blocks of another type having their legs close together and parallel.

3. The toy defined by claim 2 wherein the blocks with diverging legs have notches at the inside of the lower extremities of the legs; and the blocks with closed legs have notches at the outside of the lower extremities of the legs; said two types of blocks being adapted to engage each other by means of said notches at the leg extremities.

4. The toy defined by claim 2 wherein the distance between the shoulders and the lower extremities of the arms, is the same as the distance between said extremities and the lower extremities of the legs.

5. The toy defined by claim 2 wherein blocks having diverging legs are so proportioned that a line drawn from the point of either shoulder to the point of the toe on that side, will bisect the lower extremity of the arm.

6. The toy defined by claim 2 wherein each shoulder notch lies substantially in the plane of the edge of the sloping portion of the peaked helmet.

7. A toy comprising a plurality of types of blocks, the blocks of each type having the same shape, each of the blocks of one type having a body portion, shoulders on said body portion, notches on said shoulders, limbs extending from said shoulders, said body portion having diverging limb portions located between said limb portions first named, and each of the blocks of another type having a body portion shaped the same as the body portion of said first named type but having narrower shoulders.

8. A toy comprising a plurality of types of blocks, the blocks of each type having the same shape, each of the blocks of one type having a body portion, shoulders on said body portion, notches on said shoulders, limbs extending from said shoulders, said limbs having supporting flat portions at their bases whereby said block may, at least, be partially supported by said flat portions, said body having diverging limb portions located between said limb portions first named, and each of the blocks of another type having a body portion shaped the same as the body portion of said first named type but having narrower shoulders.

9. A toy comprising a plurality of groups of blocks, the blocks of each type having the same shape, each of the blocks of one type having a body portion, shoulders on said body portion, notches on said shoulders, limbs extending from the shoulders, said body having diverging limb portions located between said limb portions first named, and each of the blocks of another type having a body portion shaped the same as the body portion of said first named type but having narrower shoulders, certain of the limbs of said second named type of blocks being parallel with each other.

10. A toy comprising a plurality of types of blocks, the blocks of each type being of the same shape, each of the blocks of one type having a body portion, shoulders on said body portion, notches on said shoulders, limbs extending from the shoulders, said limbs having supporting flat portions at their bases whereby said block may be at least partially supported by said flat portions, said body having diverging limb portions located between said limb portions first named, and each of the elements of another type having a body portion shaped the same as the body portion of said first named type but having narrower shoulders, certain of the limbs of said second named type of blocks being parallel with each other.

11. A toy comprising a plurality of types of blocks, the blocks of each type being of the same shape, each of the blocks of one type having a body portion, shoulders on said body portion, notches on said shoulders, limbs extending from the shoulders, said body having diverging limb portions located between said limb portions first named, and each of the blocks of another type having a body portion, shoulders on said body portion, notches in said shoulders, limbs extending from said shoulders on opposite sides of said body portion, and a limb attached to said body portion located between the limbs extending from said shoulders, said limb having at least one notch near the extremity thereof.

12. A toy comprising a plurality of types of blocks, the blocks of each type being of the same shape, each of the blocks of one type having a body portion, shoulders on said body portion, notches on said shoulders, limbs extending from the shoulders, said limbs having supporting flat portions at their bases whereby said toy may be at least partially supported by said flat portions, said body having diverging limb portions located between said limb portions first named, and each of the blocks of another type having a body portion, shoulders on said body portion, notches in said shoulders, limbs extending from said shoulders on opposite sides of said body portion, and a limb attached to said body portion located between the limbs extending from said shoulders, said limb having at least one notch near the extremity thereof.

13. A toy comprising a plurality of types of blocks, the blocks of each type being of the same shape, each of the blocks of one type having a body portion, shoulders on said body portion, notches on said shoulders, limbs extending from the shoulders, said body having diverging limb portions located between said limb portions first named, and each of the blocks of another type having a body portion, shoulders and limbs extending from said shoulders identical with said first named type and having limbs extending from said body portion in a different direction from the direction of the limbs which extend from the body portion of said first named type.

14. A toy comprising a plurality of blocks adapted for edgewise assembly with each other in a vertical plane to form various types, each of said blocks having a body portion, flat shoulder portions, notches in said shoulder portions whereby portions of other blocks may be supported either in said notches or on said flat shoulder portions, limbs extending from said shoulder portions, and other limbs located between the limb portions first named, said other limbs having feet adapted for at least partially supporting the weight of said block.

15. A toy comprising a plurality of blocks adapted for edgewise assembly with each other in a vertical plane to form various types, each of said blocks having a body portion, flat shoulder portions, notches in said shoulder portions whereby other blocks may be at least partially supported either in said notches or on said flat shoulder portions, limbs extending from said shoulder portions, said limbs having flat bases whereby said blocks may be at least partially supported by said bases, and other limb portions located between the limb portions first named, said other limb portions having flat bases.

16. A toy comprising a plurality of blocks adapted for edgewise assemby with each other in a vertical plane to form various types, each of said blocks having a body portion, flat shoulder portions, notches in said shoulder portions whereby other blocks may be at least partially supported either in said notches or on said flat shoulder portions, limbs extending from said shoulder portions, said limbs having flat bases whereby said blocks may be at least partially supported by said bases, and other limb portions located between limb portions first named, said other limb portions having flat bases, and notches located on the outside of said other limb portions and between the flat portions thereof on said body portion, whereby each of said blocks may at least partially support, or be at least partially supported by any other block.

17. A toy comprising a plurality of blocks adapted for edgewise assembly with each other in a vertical plane to form various groups, each of said blocks having a body portion, flat shoulder portions, notches in said shoulder portions whereby other blocks may be at least partially supported either in said notches or on said flat shoulder portions, limbs extending from said shoulder portions, said limbs having flat bases whereby said blocks may be at least partially supported by said bases, and other limb portions located between limb portions first named, said other limb portions having flat bases, and notches located on the inside of said other limb portions and between the flat portions thereof on said body portion, whereby each of said blocks may at least partially support, or be at least partially supported by any other block.

18. A toy comprising a plurality of blocks adapted for edgewise assembly with each other in a vertical plane to form various groups, each of said blocks having a body portion, flat shoulder portions, a head located between said shoulder portions, notches in said shoulder portions whereby portions of any other block may be at least partially supported either in said notches or on said flat shoulder portions, limbs extending from said shoulder portions, and other limb portions located between limb portions first named, said other limb portions having feet constructed and adapted to support the weight of each of said blocks.

19. A toy comprising a plurality of blocks adapted for edgewise assembly with each other in a vertical plane to form various groups, each of said blocks having a body portion, flat shoulder portions, a pointed head located between said shoulder portions, notches in said shoulder portions whereby portions of any other block may be supported either in said notches or on the said flat shoulder portions, limbs extending from said shoulder portions, and other limb portions located between limb portions first named, said other limb portions having feet constructed and adapted to support the weight of each of said blocks, said pointed head and the sides of said feet being adapted to engage in the notches of the shoulders of another block when a plurality of said blocks are assembled to form a group.

20. A toy comprising a plurality of blocks adapted for being assembled edgewise upon each other in a vertical plane and forming various groups, each of said blocks having a body portion, flat shoulder portions and limbs extending from said shoulder portions, a head located between said shoulder portions, other limbs attached to said body portions in diverging relation to each other, and means on said shoulders adapted to cooperate with said diverging limbs or said head portion when said blocks are assembled to form a group, said flat shoulder portions being parallel to the bases of all of said limbs.

21. A toy comprising a plurality of blocks adapted for being assembled edgewise upon each other in a vertical plane to form various groups, each of said blocks having a body portion, shoulder portions and limbs extending from said shoulder portions, a head located between said shoulder portions, and at least one other limb attached to said body portion and located between said limbs first named, and means on said head portion and other limb portion whereby said blocks may be assembled in edgewise relation to each other to form a group, said shoulder portions being co-planar with one another and having transverse grooves located between said head and the ends of said shoulder portions.

22. A toy comprising a plurality of blocks adapted for being assembled edgewise upon each other in a vertical plane to form various groups, each of said blocks having a body portion, limbs extending from said body portion, at least one other limb attached to said body portion and located between said limbs first named, a head located between said limbs first named, and cooperating means on said head, limbs first named, and limb last named, whereby a plurality of said blocks may be assembled edgewise of each other in a group, said cooperating means serving to resist gravitational movements of certain of said blocks, the distance from the top to the bottom of the limbs first-named being substantially the same as the distance from the bottom of said limbs first-named to the bottom of the limbs second-named.

23. A toy comprising a plurality of blocks adapted for being assembled edgewise upon each other in a vertical plane and forming various groups, each of said blocks having a body portion, flat shoulder portions and limbs extending from said shoulder portions, a head located between said shoulder portions, other limbs attached to said body portions in diverging relation to each other, and means on said shoulders adapted to cooperate with said diverging limbs or said head portion when said blocks are assembled to form a group, said flat shoulder portions being parallel to the bases of said limbs second named, and said limbs first-named being parallel to and in juxtaposition with said limbs second-named when two or more of said blocks are assembled in edgewise relation to each other with the shoulder portions of one of said blocks in substantially the same plane with the bases of said second-named limbs.

CLINTON JAMES HECHT.